(12) United States Patent
Galik

(10) Patent No.: US 10,028,621 B1
(45) Date of Patent: Jul. 24, 2018

(54) HAMBURGER SHAPING AND GRILLING TOOL

(71) Applicant: Harvey Galik, Richmond, TX (US)

(72) Inventor: Harvey Galik, Richmond, TX (US)

( * ) Notice: Subject to any disclaimer, the term of this patent is extended or adjusted under 35 U.S.C. 154(b) by 403 days.

(21) Appl. No.: 14/657,030

(22) Filed: Mar. 13, 2015

(51) Int. Cl.
*A47J 43/20* (2006.01)
*A47J 43/28* (2006.01)

(52) U.S. Cl.
CPC ........... *A47J 43/20* (2013.01); *A47J 43/28* (2013.01); *A47J 43/283* (2013.01); *A23V 2002/00* (2013.01)

(58) Field of Classification Search
None
See application file for complete search history.

(56) References Cited

U.S. PATENT DOCUMENTS

| 1,326,570 | A | * | 12/1919 | Burmeister | A47J 43/283 294/8 |
|---|---|---|---|---|---|
| 2,031,183 | A | * | 2/1936 | Sonnenburg | A47G 21/10 294/7 |
| 2,643,907 | A | * | 6/1953 | Thomas | A47J 43/283 294/7 |
| 2,905,498 | A | * | 9/1959 | Lunde | B25J 1/04 294/104 |
| 3,004,283 | A | * | 10/1961 | Vanstrom | A22C 7/0046 249/157 |
| 3,761,120 | A | * | 9/1973 | Binkert | A47J 43/283 294/8 |
| 4,345,516 | A | * | 8/1982 | Sinclair | A47J 37/108 249/115 |
| 4,768,819 | A | * | 9/1988 | Tarlow | A47J 43/288 294/104 |
| 4,844,525 | A | * | 7/1989 | Tarlow | A47J 43/288 294/104 |
| 5,094,861 | A | * | 3/1992 | D'Auguste | A23P 10/10 426/112 |
| 5,230,156 | A | * | 7/1993 | Patenaude | A47J 43/20 30/123.3 |
| 5,403,052 | A | * | 4/1995 | Lampron | A47J 43/288 294/7 |
| 5,509,605 | A | * | 4/1996 | Cripe | C02F 1/002 210/266 |
| 5,934,721 | A | * | 8/1999 | Walde | A47J 37/0786 294/3 |
| 6,109,538 | A | * | 8/2000 | Villani | A47G 21/183 239/310 |
| 6,813,994 | B2 | * | 11/2004 | Williams | A47J 37/067 99/343 |

(Continued)

*Primary Examiner* — Nikki H. Dees
*Assistant Examiner* — Stephanie A Cox
(74) *Attorney, Agent, or Firm* — Karen B. Tripp

(57) ABSTRACT

An apparatus and method for preparing with one hand meat or meatless burgers or patties for cooking. The apparatus has a handle, base plate, and retainer ring. The handle allows the user to hold the apparatus while preparing a patty and placing the patty directly on a cooking surface. The base plate provides a surface for holding the patty during shaping and before placing the patty on the cooking surface. The retainer ring determines the shape of the patty. In use, meat or meat substitute is placed on the base plate and pressed against the sides of the retainer ring. The apparatus holding the formed patty is then placed over a cooking surface and flipped over so that the patty falls out onto a cooking surface for cooking.

13 Claims, 3 Drawing Sheets

(56) References Cited

U.S. PATENT DOCUMENTS

| | | | | |
|---|---|---|---|---|
| 7,100,953 B1 * | 9/2006 | Tarlow | ............... | A47J 43/283 294/104 |
| 7,318,575 B2 * | 1/2008 | Welch | ............... | A47J 43/20 249/135 |
| D609,525 S * | 2/2010 | Rabanal | ............... | D7/409 |
| 8,348,316 B2 * | 1/2013 | Hemmings | ............... | A47J 43/283 294/7 |
| 8,381,639 B2 * | 2/2013 | Ewald | ............... | A23L 15/00 426/614 |
| 8,980,348 B2 * | 3/2015 | Baron | ............... | A23C 9/156 239/33 |
| 9,504,358 B1 * | 11/2016 | Malin | ............... | A47G 21/10 |
| 2004/0026939 A1 * | 2/2004 | Jordan | ............... | A47J 43/283 294/3 |
| 2009/0243317 A1 * | 10/2009 | Li | ............... | A47G 21/10 294/3 |
| 2013/0305893 A1 * | 11/2013 | Kaufman | ............... | A47J 43/288 83/30 |

* cited by examiner

HAMBURGER SHAPING AND GRILLING TOOL

BACKGROUND

The present invention relates to cooking utensils and particularly to tools for forming, shaping and positioning hamburgers on a grill for cooking.

Hamburgers are a popular food and hamburger grilling is a popular way to cook hamburgers and is involved with a variety of leisure activities. With the never-ending popularity of the hamburger, and particularly the charcoal grilled hamburger, in American outdoor activities, there continually is a need for improvement in the cooking utensils. One common frustration with making hamburgers is the mess associated with repeated handling of the hamburger meat while trying to shape the hamburger patties, season them, and position them on the grill for cooking. Inevitably, the cook's hands become greasy and bloody from the meat, and in turn spice bottles and cooking utensils such as spatulas get greasy and bloody, and/or the cook has to repeatedly wash his or her hands. A good amount of used paper, dirty dishes and hand washing typically results. Hamburger patty presses or patty makers don't alleviate the mess problem because while they make uniform patties, they typically just result in even more utensils to wash.

SUMMARY

The present invention provides an apparatus and a method using the apparatus for preparing meat or meatless burgers or patties for cooking that provides generally uniform patties with minimal mess. The apparatus can essentially be used with one hand, allowing a cook's other hand to remain free.

The apparatus of the invention has essentially three parts—a handle, a base plate, and a retainer ring. The shape of the retainer ring determines the shape of the burgers or patties, and is typically round, although it may be oval, square, or in a novelty shape such as stars. The diameter of the ring should preferably be the same as or less than the base plate so as to rest on the base plate. The base plate provides a surface for holding the patty during shaping and before placing the hamburger patty on the cooking surface. The handle allows the user to hold the apparatus while preparing and placing a patty directly on a cooking surface.

In use, according to the method of the invention, ground meat or meat substitute is placed on the apparatus base plate and pressed against the sides of the retainer ring for shaping. The apparatus holding the formed patty is then placed over a cooking surface and flipped over so that the formed patty falls out onto the cooking surface for cooking.

BRIEF DESCRIPTION OF THE DRAWINGS

in FIG. 6, the apparatus with ground meat and seasonings nearby ready for use; in FIG. 7, forming a patty on the base plate of the apparatus; in FIG. 8, flipping the apparatus over a grill; in FIG. 9, the patty falling out of the apparatus onto a grill surface; and in FIG. 10, the patty cooking on the grill and the apparatus ready for use again.

DETAILED DESCRIPTION

Figure 1:
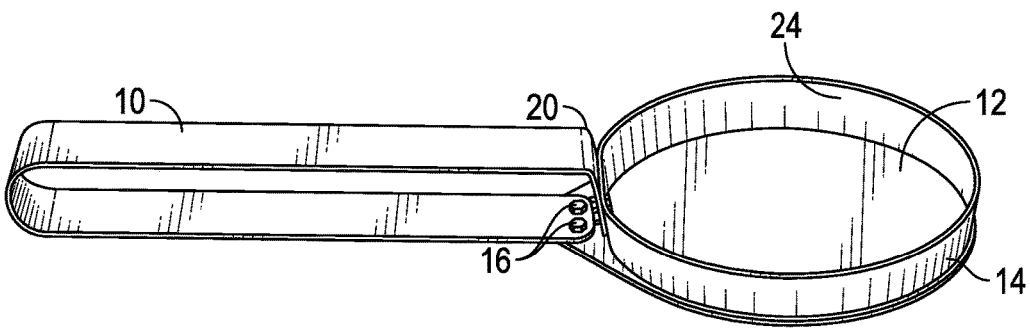
FIG. 1 is a perspective view of one embodiment of the apparatus of the present invention with its retainer ring in a resting position on its base plate.
Figure 2:
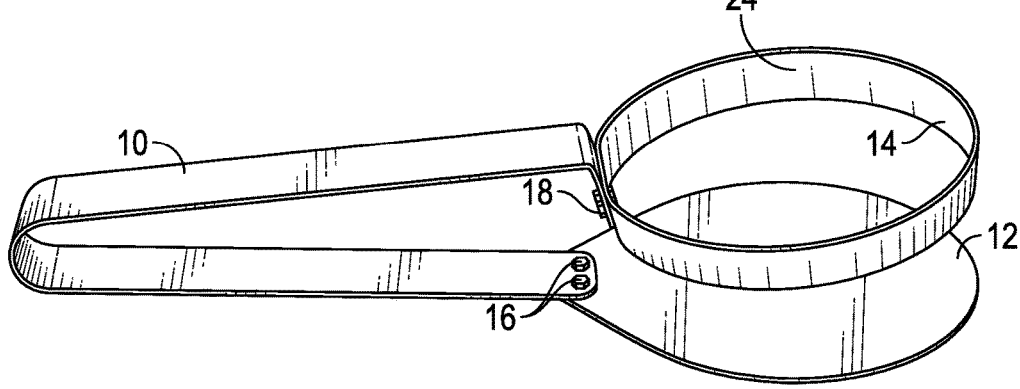
FIG. 2 is a perspective view of the apparatus of FIG. 1 showing the retainer ring in a position lifted from the base plate.
Figure 3:
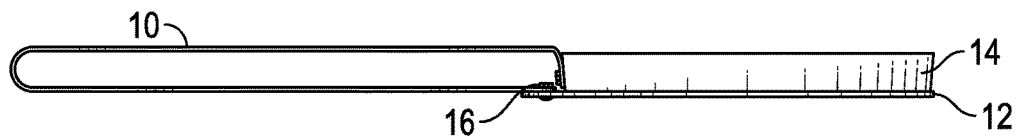
FIG. 3 is a side view of the apparatus of FIG. 1.
Figure 4:
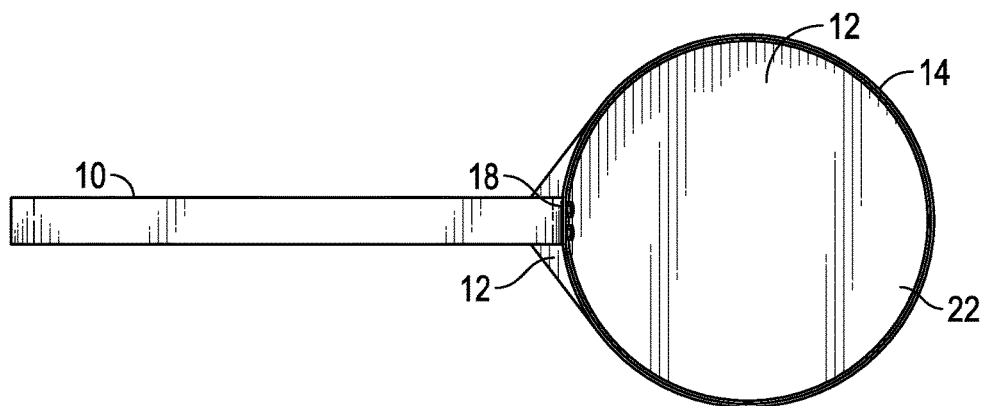
FIG. 4 is a top view of the apparatus of FIG. 1, showing the top side of the base plate.
Figure 5:
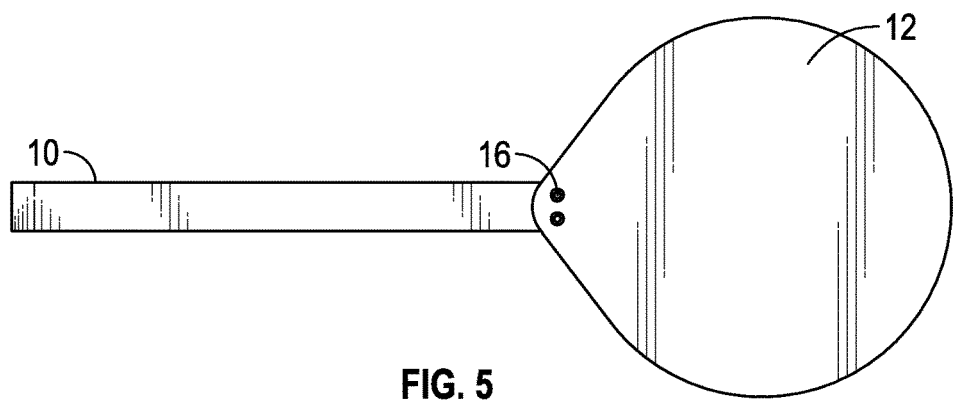
FIG. 5 is a bottom view of the apparatus of FIG. 1, showing the underside of the base plate.
Figure 6:
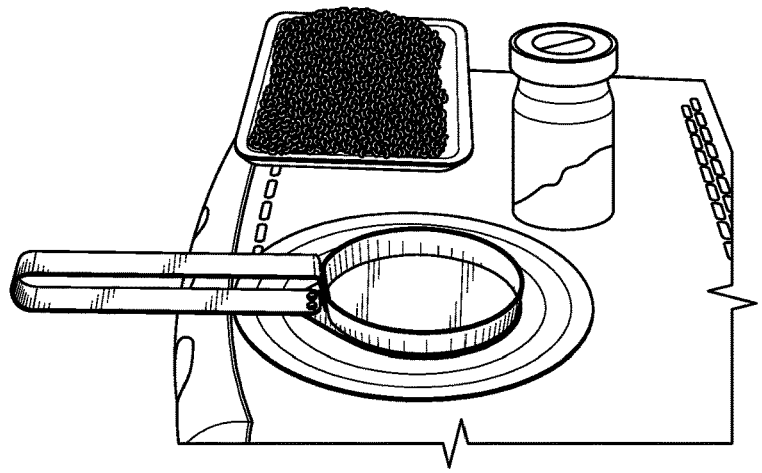
FIGS. 6-10 are schematics of one embodiment of the method of the present invention using one embodiment of the apparatus of the invention, showing.
Figure 7:
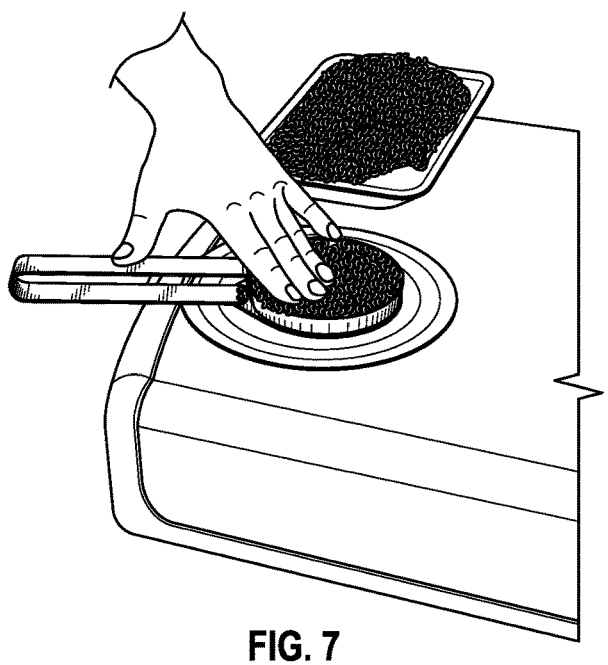
Figure 8:
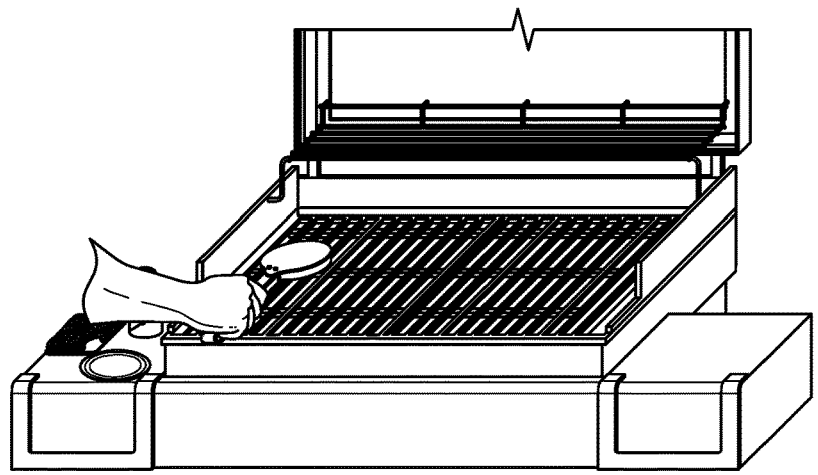
Figure 9:
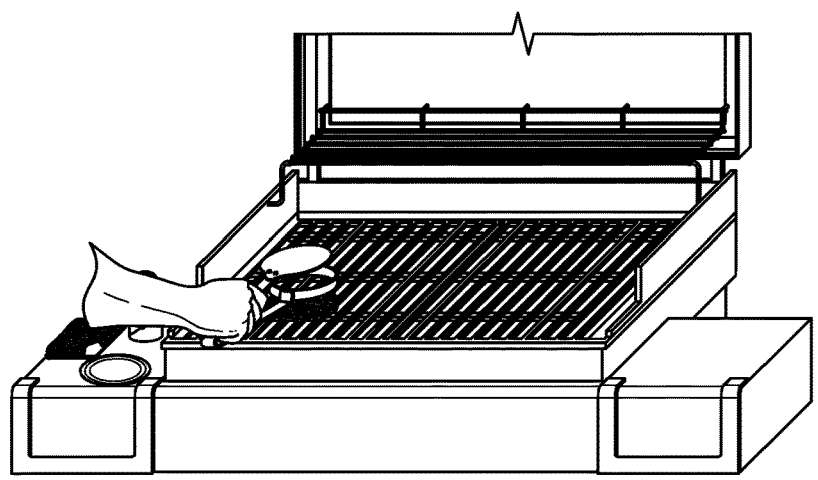
Figure 10:
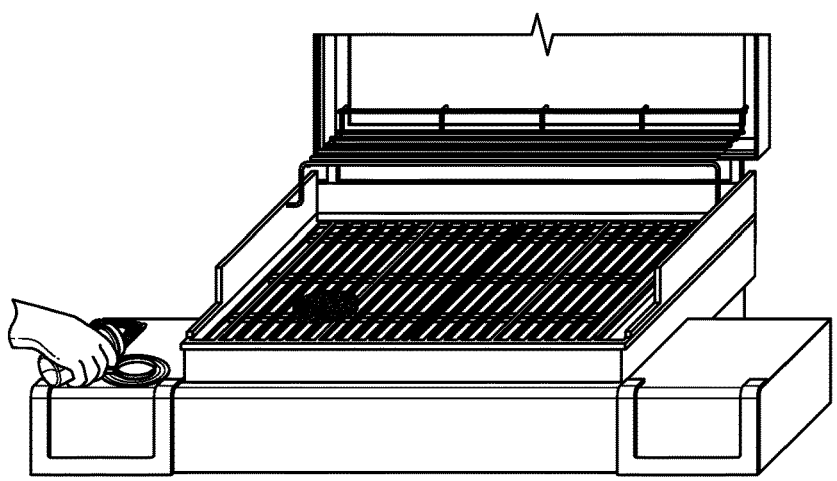

The apparatus of the present invention, and the method of using that apparatus, saves time and money, and reduces risk, in preparing meat or meatless burgers and patties for cooking, especially the ever popular hamburger. As used herein, the term "hamburger" is understood to include other similar meat and meatless burgers and patties of ground meat or meat substitute, as well as ground beef commonly referred to as hamburger. Using the apparatus of the invention for preparing burgers and patties results in less preparation time and less clean up time than with prior art utensils. Fewer surfaces and dishes have to be used and cleaned and fewer materials need to be used, thus saving labor, water, cleaners, and energy usage. There is also less cross contamination and reduced potential for cross contamination—less handling of raw meat around and on multiple surfaces and less getting raw meat residue on such multiple surfaces.

Referring to the figures, one embodiment of the apparatus of the present invention is shown in simple form. The apparatus could be made more complex than shown, with springs, hinges, buttons, knobs, adjustable bands and the like to produce different patty sizes and multiple shapes—not only round, but squares, ovals, stars, etc. The apparatus could also be made of one or more of a variety of materials—for nonlimiting examples: stainless steel, coated carbon steel, coated aluminum, aluminum, rubber, various synthetic rubbers, various plastics, silicone, and wood. The selection of materials depends on intended use—commercial or residential—and the desired trade off for strength, durability and costs. Generally, the stronger the product is made to be, the longer it will last.

The design of one embodiment of the apparatus of the invention as shown in the figures consists essentially of three basic parts—a handle 10, a base plate 12, and a retainer ring 14. As shown, handle 10 is one piece, constructed of a flexible metal such as for example thin stainless steel or aluminum, or other material that bends and holds its shape while allowing some flexing. As shown, handle 10 is generally "U" shaped, with one open end connected to a base plate 12 with connectors 16 and the other open end 20 bent down about 90 degrees and connected to a retainer ring 14 with connectors 18. Connectors 16 and connectors 18 as shown may be screws or brads or nuts and bolts. Alternatively, handle 10 could be connected to base plate 12 and retainer ring 14 by other connecting means such as for non-limiting example welding (assuming handle 10, base plate 12 and retainer ring 14 are comprised of metals that may be welded) and or gluing. Further alternatively, if molded in plastic, or formed from silicone or rubber, handle 10, base plate 12 and retainer ring 14 might all be comprised of one piece of such plastic, silicone or rubber so no actual connectors or connections would be needed.

Handle 10 is useful for holding the apparatus while preparing and placing a hamburger patty directly on a cooking surface. Handle 10 is typically about six to about ten inches in length for an apparatus intended for indoor kitchen use and about eight to about fourteen inches in length for outdoor kitchen or grill use. Base plate 12 provides a surface for holding the hamburger patty during shaping and before placing the hamburger patty on the cooking surface. Base plate 12 is typically about two to about four inches in diameter for small patties and about four to about eight inches in diameter for small to large patties. Retainer ring 14 contains and shapes the hamburger resting on the base plate for preparation of the hamburger patty. Retainer ring 14 is shown in the figures as having a round shape that is common and typically desired for a hamburger patty. However, retainer ring 14 could have other shapes for forming hamburger patties in alternative shapes. Examples of such alternative shapes include, without limitation, a hollow star, square, and oval. In one embodiment, retainer ring 14 could be affixed to the handle 10 with easily removable and replaceable or connectable connectors 18, such as for non-limiting example, snaps, so that the retainer ring 14 could be easily changed, allowing different shape retainer rings to be used with the same handle 10 and base plate 12, affording more variety with a single apparatus. In any case, it is most preferable for retainer ring 14 to have the same or similar diameter as base plate 12 or at least a perimeter not extending at any point beyond base plate 12 on which retainer ring 14 rests. In one embodiment, base plate 12 is also connected to handle 10 with easily removable and replaceable or connectable connectors 16 so that base plate 12 could be changed when retainer ring 14 is changed so that the perimeter shape of base plate 12 could more closely match the shape of retainer ring 14. In another embodiment, base plate 12 is not changed to a different shape to match the retainer ring shape when the retainer ring shape is changed but base plate 12 has the same or a larger diameter than retainer ring 14 so that retainer ring 14 at no point extends beyond or outside the edge of base plate 12.

In using the apparatus, a user may optionally place seasoning on the topside surface 22 of base plate 12 and then place a portion of ground meat or meat substitute on the surface 22 or the user may forgo the seasoning and place a portion of ground meat or meat substitute on the surface 22 for forming a patty. Once the meat or meat substitute is resting on the topside surface 22 of base plate 12, the user presses the meat down against the base plate 12 and out against the inside wall 24 of retainer ring 14 to form a patty. Most preferably the amount of meat positioned on the retainer ring is such that the patty is not formed with a height higher than the height of retainer ring 14. Pressing the meat down more in the center of the base plate 12 than nearer the wall 24 of retainer ring 14 will usually result in the patty being flatter when cooked but is not a requirement for purposes of the invention. It is contemplated that the user will press the meat against the surface 22 of base plate 12 and wall 24 by hand but the user alternately could use another tool such as a spoon, spatula, or fork for non-limiting example. Once the patty is formed and resting on base plate 12, the user may optionally then season the patty or proceed directly to moving the patty to a cooking surface such as a grill or pan without adding seasoning. In moving the patty to a cooking surface from base plate 12, the user would flip the apparatus over so that the topside surface is turned to face the cooking surface and allow the patty to fall from base plate 12 onto the cooking surface.

Base plate 12 is releasably connected to or associated with retainer ring 14 so that retainer ring 14 may be lifted from base plate 12 for cleaning and also for sometimes easier removal of a shaped hamburger patty from base plate 12 for placement of the hamburger patty on a cooking surface. Such releasable connection may be obtained in one embodiment, such as the embodiment shown in the figures, by flexibility of the handle 10 so that a person holding handle 10 in one hand can squeeze the handle 10 lightly to close or to hold the retainer ring 14 resting on top of the base plate 12. In this embodiment, a finger between or through the two sides of the "U" shape of the handle 10 could open, lift, or push the retainer ring 14 off of base plate 12 (or lift the base plate 12 apart from the retainer ring 14) when the patty is being moved from the base plate 12 onto a cooking surface. In one embodiment, retainer ring 14 is angled outward from the base plate 12 in the range of about of about zero to about forty-five degrees to allow the hamburger patty to fall off of base plate 12 onto a cooking surface more readily. Lifting retainer ring 14 from the base plate 12 or off of the base plate surface 22 is not necessary for moving a hamburger patty from the base plate surface 22 to a cooking surface, but it is believed that lifting the retainer ring 14 may sometimes result in faster movement of the patty from the base plate surface 22 to a cooking surface.

It is contemplated that all of the steps using the apparatus may be done by a user only handling the hamburger with one hand, keeping the user's other hand clean of meat and free to handle items such as for non-limiting example jars containing seasonings, a cooking pan, and/or a grill lid without contaminating same with raw meat residue. In this manner, the apparatus of the invention reduces cross contamination and potential cross contamination and also saves time and costs associated with cleaning the various items and hands. The apparatus is also well suited for use by a handicapped person who has only one arm and hand or who might have use of only one arm and hand.

It is clear that the present invention is well adapted to carry out the objects and to attain the ends and advantages mentioned as well as those inherent therein. While presently preferred embodiments of the invention have been described for purposes of this disclosure, numerous changes may be made which will readily suggest themselves from this disclosure to those skilled in the art and which are encompassed within the spirit of the invention disclosed and as defined in the appended claims. Thus, it should be understood that the foregoing relates only to some embodiments of the present invention, and that numerous other uses, changes and modifications therein may be made without departing from the spirit and scope of the invention as defined in the following claims.

What is claimed is:

1. A hamburger patty preparation apparatus for manual use by a person, the apparatus consisting of:
   a u-shaped handle comprising two ends;
   a base plate on one end of the handle; and
   a retainer ring on the opposing end of the handle; and
   connectors for connecting one end of the handle to the base plate and for connecting the opposing end of the handle to the retainer ring;
   wherein the handle is comprised of a material imparting sufficient flex to the handle to enable the said two ends of the handle to be held together by one hand of the person for shaping and containing a hamburger patty, and to be held apart by said hand of the person for cleaning or for removing the hamburger patty from the apparatus for positioning the patty on a cooking surface;
   wherein the base plate provides a surface for holding the hamburger patty during shaping and before placing the hamburger patty on the cooking surface;
   wherein the retainer ring contains and shapes the hamburger resting on the base plate for preparation of the hamburger patty, the retainer ring having a shape that is desired for a hamburger patty;

wherein the base plate is held to the retainer ring by manual flex of the handle so that the retainer ring can be manually lifted from the base plate for cleaning or for removal of a shaped hamburger patty from the base plate for placement of the hamburger patty on the cooking surface, or the retainer ring can be allowed to rest on the base plate for shaping hamburger placed on the base plate into a patty;

wherein the retainer ring can be removable and replaceable so that the apparatus can accommodate rings of different shapes for shaping hamburger patties into different shapes; and wherein the base plate can be removable and replaceable so that the apparatus can accommodate different shaped base plates to match or coordinate with different shaped retainer rings.

2. The apparatus of claim 1 wherein the retainer ring is circular, oblong, oval, or square in shape.

3. The apparatus of claim 1 wherein the retainer ring has the shape of a letter, monogram, or fanciful shape.

4. The apparatus of claim 1 comprised of iron, enameled iron, stainless steel, coated carbon steel, aluminum, or coated aluminum.

5. The apparatus of claim 1 comprised of wood, plastic, rubber, synthetic rubber, or silicone.

6. The apparatus of claim 1 wherein the handle is about 6 to about 10 inches in length for indoor use.

7. The apparatus of claim 1 wherein the handle is about 8 to about 14 inches in length for use with an outdoor grill.

8. The apparatus of claim 1 for use in preparing burgers or patties comprising ground meat selected from beef, turkey, venison, chicken, buffalo, salmon, and tuna.

9. The apparatus of claim 1 for use in preparing burgers or patties comprising meat substitute comprising grains or tofu.

10. The apparatus of claim 1 wherein the retainer ring is angled outward from the base plate up to about 45 degrees.

11. A method for preparing meat or meatless burgers or patties for cooking by an individual person, the method comprising:

(a) gathering supplies comprising ground meat or meat substitute for comprising one or more burgers or patties; seasonings, and an apparatus consisting of:
a u-shaped handle comprising two ends;
a base plate on one end of the handle; and
a retainer ring on the opposing end of the handle; and
connectors for connecting one end of the handle to the base plate and for connecting the opposing end of the handle to the retainer ring;
wherein the handle has sufficient flex to enable the person, by one hand, to hold said two ends of the handle together for shaping and containing a hamburger patty, and to hold said two ends of the handle apart for cleaning or for removing the hamburger patty from the apparatus for positioning the patty on a cooking surface;

wherein the base plate provides a surface for supporting the hamburger patty during shaping and before placing the hamburger patty on the cooking surface;

wherein the retainer ring contains and shapes the hamburger resting on the base plate for preparation of the hamburger patty, the retainer ring having a shape that is desired for a hamburger patty;

wherein the person can allow the retainer ring to rest on the base plate for shaping hamburger placed on the base plate into a patty, or can hold the base plate to the retainer ring by manually flexing the handle, or can lift the retainer ring from the base plate by manually flexing the handle for cleaning or for removal of a shaped hamburger patty from the base plate for placement of the hamburger patty on the cooking surface;

wherein the retainer ring can be removable and replaceable so that the apparatus can accommodate rings of different shapes for shaping hamburger patties into different shapes; and wherein the base plate can be removable and replaceable so that the apparatus can accommodate different shaped base plates to match or coordinate with different shaped retainer rings;

(b) optionally placing seasoning on the topside surface of the base plate;

(c) placing a portion of the meat or meat substitute sufficient for comprising one patty onto the topside surface of the base plate and pressing same against the retainer ring to form a patty with a perimeter shape corresponding to the retainer ring shape;

(d) optionally pressing the meat or meat substitute more in the center than elsewhere on the base plate;

(e) optionally placing seasoning on top of the meat or meat substitute on the base plate;

(f) positioning the base plate containing the patty over a cooking surface so that the patty resting on the topside of the base plate is facing the cooking surface; and (g) allowing the patty to release from the base plate and move onto the cooking surface for cooking, while optionally lifting or pushing the retainer ring from the base plate by manually flexing the handle to facilitate or expedite the releasing of the patty from the base plate.

12. The method of claim 11 wherein steps (c) and (d) are conducted with one hand of the person and the other steps are done with the person's other hand, allowing that other hand to avoid direct contact with the meat or meat substitute.

13. The method of claim 11 wherein all steps are conducted with one hand.

\* \* \* \* \*